United States Patent [19]

Chi et al.

[11] Patent Number: 5,075,801
[45] Date of Patent: Dec. 24, 1991

[54] ELECTROMAGNETIC DRIVE CIRCUITRY FOR ANHYSTERETIC DUPLICATION OF A FLEXIBLE MAGNETIC DISK

[75] Inventors: Chao S. Chi, Escondido; Richard J. McClure, San Diego, both of Calif.

[73] Assignee: Eastman Kodak Company, Rochester, N.Y.

[21] Appl. No.: 744,047

[22] Filed: Aug. 12, 1991

[51] Int. Cl.[5] ............................................. G11B 5/86
[52] U.S. Cl. ..................................... 360/17; 360/119; 360/130.34
[58] Field of Search ................................... 360/15–17, 360/119, 122, 130.34

[56] References Cited

U.S. PATENT DOCUMENTS

| | | | |
|---|---|---|---|
| 2,867,692 | 1/1959 | Camras | 360/17 |
| 4,071,869 | 1/1978 | Feieraband et al. | 360/17 |
| 4,422,106 | 12/1983 | Sawazaki | 360/17 |
| 4,644,416 | 2/1987 | Yamada | 360/17 |

FOREIGN PATENT DOCUMENTS 63-183623  7/1988  Japan .

*Primary Examiner*—Vincent P. Canney
*Attorney, Agent, or Firm*—Dennis P. Monteith

[57] ABSTRACT

Electromagnetic drive circuitry, for recording information on a flexible magnetic slave disk by contact transfer of information recorded on a flexible magnetic master disk, includes a U-shaped electromagnetic device terminating, respectively, in a first planar pole tip axially aligned with a second movably mounted planar pole tip, to define a closed-loop flux-conducting path extending through a contact-transfer zone between the pole tips. The drive circuitry further includes signal-modulating circuitry for applying an alternating voltage of progressively decreasing amplitude to the electromagnetic device, to develop an alternating magnetic field of progressively diminishing strength in the closed-loop flux-conducting path that produces a corresponding alternating magnetic transfer field extending axially in the contact-transfer zone between the planar pole tips.

2 Claims, 3 Drawing Sheets

ELECTROMAGNETIC DRIVE CIRCUITRY FOR ANHYSTERETIC DUPLICATION OF A FLEXIBLE MAGNETIC DISK

CROSS-REFERENCE TO A RELATED APPLICATION

Reference is hereby made to U.S. Pat. application Ser. No. 7/744,048 filed on even date herewith in the names of C. Chi et al and entitled APPARATUS FOR ANHYSTERETIC DUPLICATION OF A FLEXIBLE MAGNETIC DISK.

BACKGROUND OF THE INVENTION

1. Field of the Invention

This invention relates to magnetic recording, and in particular to electromagnetic drive circuitry for anhysteretic duplication of a pre-recorded floppy diskette.

2. Description Relative to the Prior Art

Magnetic recording media play a critically important role in the storage of digital data. A floppy diskette or disk is currently one of the most commonly used magnetic media; millions of both pre-recorded and unrecorded diskettes are sold for use in personal, office and workstation computer systems.

A diskette must be appropriately formatted before it can be utilized in a computer system. Formatting involves recording markers on the diskette which divide the recording surface into identified sectors, and which provide synchronizing signals essential in recording and reading information on the diskette. High-track-density applications of formatting may also include writing tracking servo signals over the recording surface. Formatting can be a very time consuming job, and an unformatted diskette is usually formatted on a diskette drive of the user's system by recording formatting signals under control of the disk operating system (DOS) of the computer. Pre-formatted diskettes are available in the marketplace, and in the prior art such diskettes have generally also been formatted in so-called real time by the manufacturer on standard disk drives. Using the DOS of an associated computer, these diskettes are individually formatted by means of signals applied to the recording head of the disk drive in substantially the identical manner to the process used in a personal computer diskette formatting operation.

There is also an extremely large market for pre-recorded diskettes containing application programs. Word processing programs, database programs, computational programs, and games programs are just a few of the myriad pre-recorded programs available on diskettes. Generally, these programs have similarly been transferred from master recordings to slave diskettes by conventional re-writing. The master is read by a standard disk drive, and the read signals are fed in real time to one or more satellite recording drives on which the slave diskettes are mounted. This method of duplication, which is essentially the same as the pre-formatting method described above, is similarly slow, laborious, and expensive to implement.

It is also known in the art that a magnetic pattern may be anhysteretically transferred from a master medium to a slave medium by means of a magnetic transfer field applied to the master and slave. In anhysteretic processing, the master medium, which typically has a coercivity of about three times that of the slave medium, is placed in intimate contact with the slave medium. The in-contact master and slave are both subjected to a decreasing-amplitude alternating-polarity magnetic field. The transfer field is not of great enough strength to substantially affect the magnetization of the master; the transfer field does, however, successively switch the magnetization of the magnetic particles of the slave between two magnetic states. As the amplitude of the transfer field is decreased, the remanent magnetization of the slave assumes a final value proportional to the magnetization of the master.

Kokai No. 63-183623 discloses apparatus for pre-formatting a flexible slave disk by an anhysteretic transfer process. For that purpose, the flexible disk is mounted on a rotatable shaft between opposing poles of a pair of electromagnets which cooperatively provide a magnetic transfer field. In order to subject opposite surfaces to a transfer field of similar intensity, the flexible disk is held in a fixed plane midway between opposing poles of the two electromagnets. This is accomplished by sandwiching the slave disk between a pair of rigid or hard disks, which also serve as pre-formatted master media.

Although pre-formatted information is duplicated on a flexible disk by an anhysteretic transfer process, the drive circuitry of 63-183623 introduces additional cost and complexity into the duplication process. This is because the two electromagnetics and their associated drive coils must have matched magnetic characteristics in order to subject opposing surfaces of the flexible slave disk to a magnetic transfer field of substantially the same intensity.

SUMMARY OF THE INVENTION

In view of the foregoing, an object of the present invention is to provide circuitry of relatively simple design and construction, suitable for a low-cost operation for effecting anhysteretic transfer of information onto a flexible slave diskette.

The object of the invention is achieved by means of electromagnetic drive circuitry comprising an energizable electromagnetic device, shaped to define a closed-loop flux-conducting path extending between a first planar pole tip spaced with respect to a second planar pole tip to cooperatively secure a flexible magnetic master disk in non-slipping engagement with a flexible magnetic slave disk in a contact-transfer zone between the two planar pole tips. In a preferred embodiment, a transformer has its primary and secondary windings mounted for relative movement for changing the amount of magnetic coupling between the two windings. Preferably, a motor serves for moving the primary winding relative to the secondary winding. A control switch, operably associated with the motor and the secondary winding, couples the secondary winding to the electromagnetic device when the motor moves the primary winding so as to decrease the magnetic coupling between the two windings. With this arrangement, an alternating magnetic field of progressively diminishing strength is developed in the closed-loop flux-conducting path that produces a corresponding magnetic transfer field in the contact-transfer zone between the planar pole tips, thereby subjecting the master disk and the slave disk to a temporally varying magnetic transfer field of progressively diminishing strength while held together in the contact-transfer zone between the spaced pole tips.

In an alternate preferred embodiment, the electromagnetic drive circuitry, in addition to the aforementioned electromagnetic device, comprises a voltage-controlled device arranged to produce an alternating electrical signal of a given frequency. A function generator, arranged for producing a progressively decreasing control voltage, has its output connected to the voltage-controlled device for modulating the alternating electrical signal by progressively decreasing its amplitude. A suitable amplifier couples the output of the voltage-controlled device and the electromagnetic device.

For recording information on a double-sided flexible slave disk, the slave disk is clamped between a pair of flexible master disks, with each master disk being in intimate facing relationship with one of the pole tips.

A master floppy diskette is composed of a magnetic recording surface applied to a conventional floppy substrate, and is recorded by means of a standard floppy disk drive. Preferably, a master recording surface is coated with metal particles having an easy axis of magnetization in the plane of the master and a hard axis of magnetization orthogonal to the plane of the master. When mounted between spaced pole tips of an electromagnetic device, the direction of the progressively decreasing transfer field lies orthogonal to the recording surface in the direction of the hard axis. The slave disk, on the other hand, comprises a magnetic coating (single or double sided) having an easy axis of magnetization orthogonal to the plane of the slave, whereby the transfer field lies in the direction of the slave's easy axis. This configuration allows effective duplication without excessive demagnetization of a master disk by the transfer field. For optimum transfer, the maximum amplitude of the transfer field is between 1.75 times the coercivity of the master magnetic coating, and the coercivity of the master magnetic coating divided by 1.75.

This advantage, as well as other advantages of the invention, will become more apparent in the detailed description of two preferred embodiments of drive circuitry presented below.

BRIEF DESCRIPTION OF THE DRAWINGS

The invention will be described with reference to the figures, of which.

DETAILED DESCRIPTION OF PREFERRED EMBODIMENTS

Figure 1:
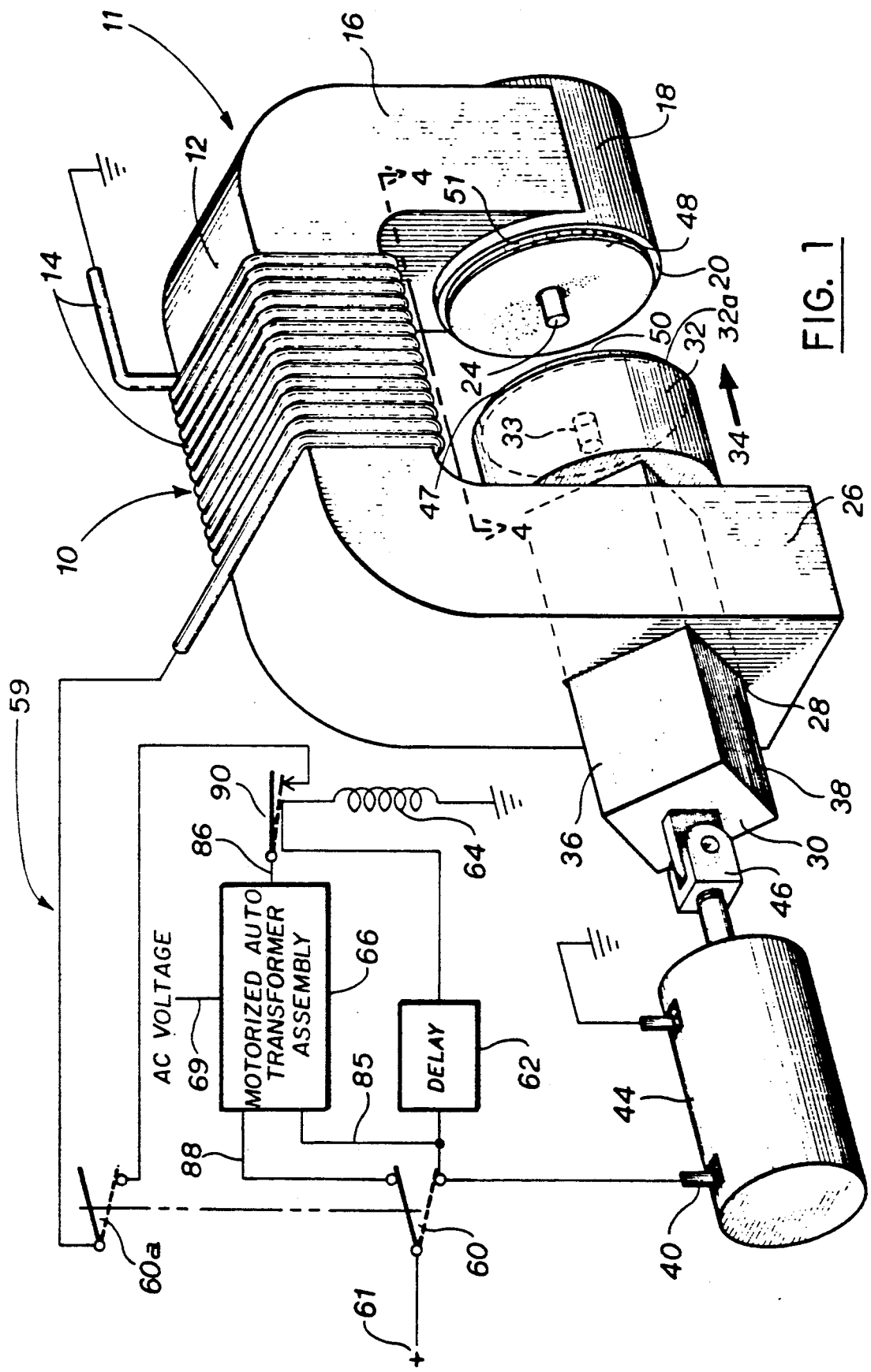
FIG. 1 is an illustration of diskette duplication apparatus having drive circuitry in accordance with the invention.

Referring to FIG. 1, diskette duplicating apparatus 10 includes an electromagnetic device, denoted generally 11, comprising a high permeability U-shaped electromagnet 12 of soft magnetic material having a coil 14 wound on a back bar of the electromagnet. One leg 16 of the electromagnet 12 terminates in a cylindrically shaped pole piece 18 having a planar pole tip 20. A precision spindle 24 is located along a central axis of the pole piece 18, the spindle having a diameter just sufficient to clear the hole in the center in either a slave or a master diskette. A second leg 26 of the U-shaped electromagnet 12 contains an aperture 28 in which an elongated magnetic member 30 is positioned for slidable movement relative to the pole piece 18. Attached to one end of the member 30 is a second cylindrical pole piece 32 having a planar pole tip 32a. The body of the pole piece 32 has an axial hole 33, aligned with the precision spindle 24, which serves for accepting the spindle 24 when the member 30 is advanced such that the pole pieces 18, 32 are immediately adjacent each other.

The electromagnetic device 11, comprising the U-shaped electromagnet 12 and the opposing pair of cylindrically shaped pole pieces 18 and 32 terminating, respectively, in the axially aligned planar pole tips 20 and 32a, serves to provide a closed-loop flux-conducting path extending through the gap or space between the pole tips. This closed-loop flux-conducting path functions to transfer a magnetomotive force, generated by the coil 14, across the gap between the pole tips 20, 32a. To that end, the respective diameters of the pole tip 20 and the pole tip 32a are the same and are chosen to be greater than either the diameter of a master diskette to be duplicated or a corresponding slave diskette. With this arrangement and with the high permeability of the electromagnet 12, both the master diskette and the slave diskette are subjected to a magnetic transfer field which, at any point in time, is uniform across the useable recording surface of each diskette.

A portion of the magnetomotive force generated by the coil 14, however, is dropped across any reluctance present in magnetic structure defining the closed-loop path. Therefore, in order to transfer a maximum magnetic field to the gap between the pole tips 20, 32a, it is necessary that the reluctance of the flux-conducting path be minimal. To that end, the member 30 fits snugly but slidably in the aperture 28 to minimize the separation between the member 30 and the leg 26 of the U-shaped electromagnet 12. Also, the member 30 is sized so that its surfaces, for example 36, 38, which are in contact with opposing surfaces of the leg 26, and through which magnetic flux passes, are maximized.

In order to duplicate information on a double-sided slave diskette, two master diskettes, composed of substrates 51, 47 coated with respective magnetic surfaces 48, 50, are fastened, respectively, to the planar tips of the pole pieces 18, 32 by suitable means such as an adhesive or the like. The double-sided slave diskette is then mounted onto the spindle 24 and the member 30 is advanced in the direction of the arrow 34, in a manner to be described more fully below. The member 30 moves until the pole pieces 18, 32 clamp the slave diskette in a contact-transfer zone between the planar pole tips 20, 32a, in intimate contact between the magnetic surfaces 48, 50 of the two master diskettes.

The member 30 is advanced by supplying power at a terminal 40 of a linear actuator 44 which drives the member 30 by means of a coupling 46. For that purpose, an operator controlled switch 60 is depressed, thereby applying a DC voltage 61 through the make contact of the switch 60 to terminal 40 of the linear actuator 44. In response thereto, the linear actuator 44 advances the pole piece 32, via the coupling 46 and the member 30, in the direction of the arrow 34. The master diskettes, having substrates 51, 47 bonded by the aforementioned adhesive to the planar faces 20, 32a of the pole pieces 18, 32, hold a slave diskette (not shown) in the contact-transfer zone in intimate contact therebetween when the member 30 is fully advanced.

The DC voltage 61 is also applied through the switch 60 to a delay 62 whose output drives a relay 64. The delay 62 serves to ensure that the actuator 44 has completed its travel before the relay 64 is activated.

In the embodiment of FIG. 1, electromagnetic drive circuitry, in accordance with the invention, includes the electromagnetic device 11, a dual-input motorized auto transformer assembly 66 comprising a transformer 68 (FIG. 2), which is energized by a suitable AC voltage source applied to a control line 69, and a bi-directional DC motor 70 (also FIG. 2), which serves to drive the auto transformer for the purpose of providing a progressively decreasing voltage across the output of the transformer.

Figure 2:
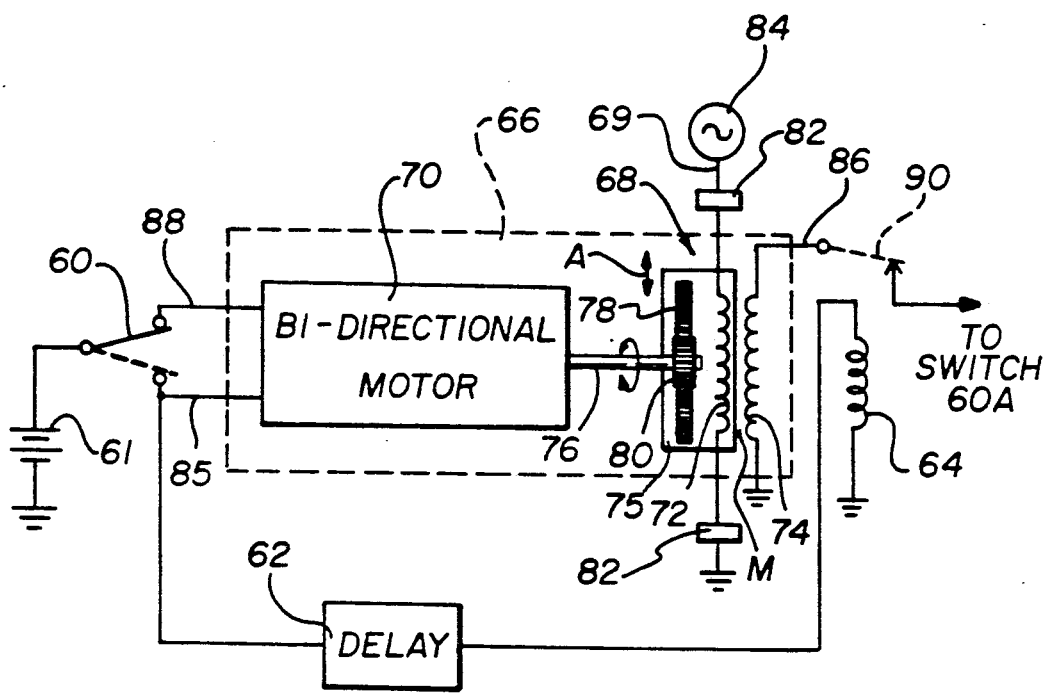
FIG. 2 is a schematic, partially in block diagram form, of the drive circuitry of FIG. 1.

In the embodiment of FIG. 2, a decreasing output voltage is provided by progressively changing the magnetic coupling, M, between a primary winding 72 and a secondary winding 74 of the transformer 68. To that end, the primary winding 72 is secured to a member 75 which is mounted for slidable linear movement in opposing directions, as denoted by the double-headed arrow A. For that purpose, a rack 78 and a pinion 80 couple the member 75 and the output drive shaft 76 of the motor 70, as shown. To permit relative movement, suitable means 82 such as slip rings or the like connect opposing ends of the primary winding 72 to the AC voltage source, denoted 84, and electrical ground.

In operation, when DC voltage 61 is applied to a first DC input 85, the bi-directional motor 70 drives the auto transformer assembly 66 so that an AC voltage at its output 86 decreases. For that purpose, the motor 70 drives the primary winding 72 from an initial position, in which maximum magnetic coupling M occurs with the secondary winding 74, to a final position in which minimum magnetic coupling exists. When the voltage 61 is applied to a second DC input 88, however, the DC motor 70 rotates in the opposite direction to move the primary winding 72 from its final position back to its initial position, whereby the AC voltage at the output 86 is caused to increase. The motorized auto transformer assembly 66 is provided with internal limit switches which stop the motor rotation when the primary winding 72 of the auto transformer 68 is driven to either end of its range.

When an operator moves the switch 60 to its actuated position, shown by the broken line, the AC voltage at the output 86 is transferred through the make contact 90 of the relay 64 and also through a serially connected contact 60a, which is closed as long as the switch 60 is actuated, as shown diagrammatically. In this switch position, the AC output voltage of the auto transformer assembly 66 is thereby applied to the coil 14 of the electromagnet 12 which consequently generates a magnetic transfer field in the contact-transfer zone between the tips 20, 32a of the pole pieces 18, 32.

It will be recalled that the DC voltage applied at input 85 causes the output voltage of the auto transformer assembly 66 to decrease. In doing so, the voltage falls linearly from a maximum value to zero volts as the DC motor 70 of the assembly 66 drives the primary winding 72 of the auto transformer 68 from its initial position to its final position. Thus, the magnetic transfer field generated by the electromagnet device 11 decreases progressively from a maximum field to a zero field, resulting in the duplication of information on the two master diskettes on the respective surfaces of a double-sided slave diskette.

After the output of the assembly 66 has dropped to zero volts, the operator releases the switch 60, which breaks the current path to the coil 14 and simultaneously de-energizes the linear actuator 44. The linear actuator has an internal spring return (not shown), which withdraws the member 30 to separate the pole pieces 18, 32 from each other. The operator then removes the slave diskette from the spindle 24, and reloads a new diskette for the next operating cycle.

When the switch 60 is released, the DC voltage 61 is applied to the second input 88 of the motorized auto transformer assembly 66, which drives the motor 70 so that the primary winding 72 of the auto transformer 68 is returned to its initial maximum output voltage position. Since the contact 60a is now open, however, no current can flow to the coil 14 during this part of the cycle. Accordingly, there is no danger of applying an unwanted magnetic field to the slave diskette prior to its removal from the spindle 24.

Figure 3:
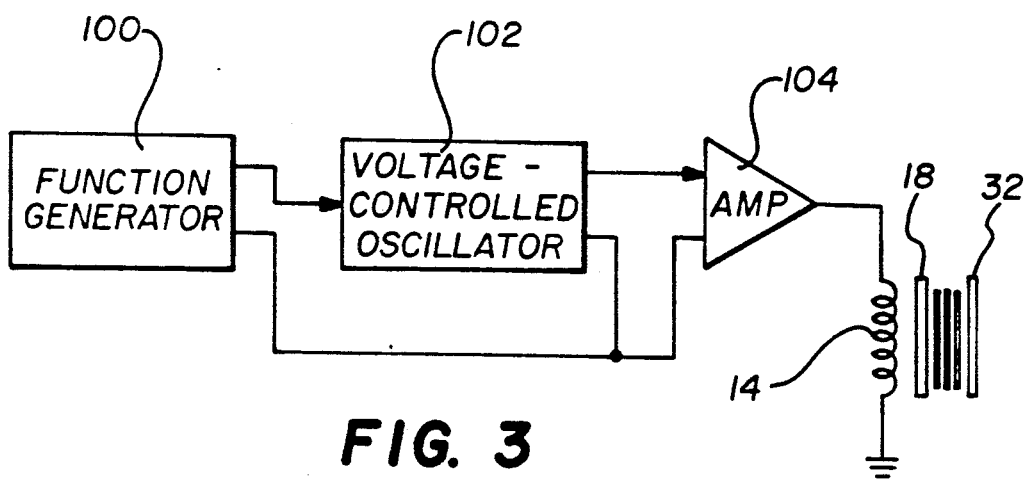
FIG. 3 is a block diagram of an alternate preferred embodiment of drive circuitry in accordance with the invention.

FIG. 3 shows an alternate preferred embodiment of drive circuitry in accordance with the invention. In addition to the electromagnetic device 11, the drive circuitry of FIG. 3 includes a function generator 100 arranged for producing a progressively decreasing control voltage. A voltage-controlled oscillator 102, having its input connected to the output of the function generator 100, serves for producing an alternating electrical signal of a given frequency. The function generator 100, by means of its progressively decreasing output voltage, modulates the output of the voltage-controlled oscillator 102 to produce an alternating electrical signal of a given frequency whose amplitude progressively decreases. An amplifier 104, couples the output of the oscillator 102 to the coil 14, to develop an alternating magnetic field of progressively diminishing strength in the closed-loop path of the electromagnetic device 11.

In the embodiment of FIG. 3, the voltage-controlled oscillator 102, for example, produces a 0.2-Hz signal which is modulated for one-cycle of a 0.002-Hz triangle waveform produced by the function generator 100. In other words, the triangle waveform has a 500-second period during which 100 cycles of the 0.2-Hz alternating signal are produced. The first 50 cycles occur during the "ramp-up" portion of the triangle waveform and, accordingly, have no affect on the anhysteretic process. The second 50 cycles progressively decrease in amplitude and thereby produce the desired switching of the magnetization of the slave disk. Although 50 full cycles are in excess of the number of cycles required for an anhysteretic transfer operation, 50 cycles were chosen in the embodiment of FIG. 3 to eliminate a DC offset since that can produce a systematic bit shift in the duplicated recording on the slave disk.

The low frequency (0.2 Hz) solves the problem of eddy currents excluding flux in the center of the poles. By using laminated poles, higher signal frequencies can be used or, by using ferrite, even higher frequencies can be exploited. An advantage of higher frequencies is, of course, that less time is consumed in duplication.

Figure 4:
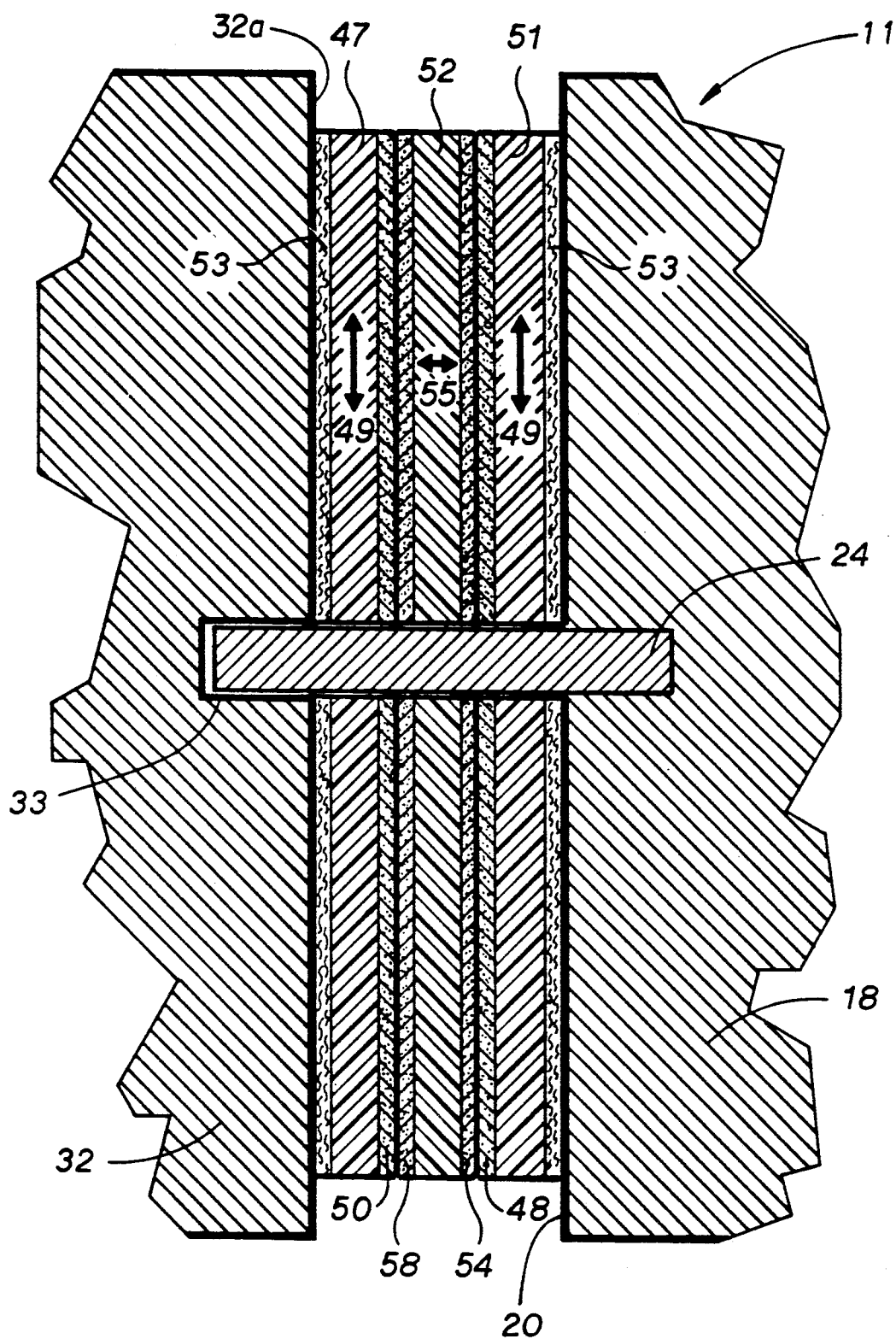
FIG. 4 is a cross-sectional view, taken along the lines 4—4 of FIG. 1, showing a slave diskette sandwiched between a pair of opposing master diskettes.

FIG. 4 shows the electromagnetic device 11 in its disk-clamping position. As shown, the two master diskettes having substrates 51, 47 are bonded to the pole pieces 18, 32 by use of an adhesive 53, and a slave diskette having a substrate 52 is mounted on the spindle 24. The surfaces 48, 50 of the two masters, which are preferably composed of metal particles having their respective easy axes, denoted 49, in the planes of the surfaces 48, 50 and their hard axes orthogonal thereto, are in intimate contact with the magnetic surfaces 54, 58 of the slave disk 52. The surfaces 54, 58 preferably contain magnetic particles whose respective easy axes 55 are orthogonal to the surfaces 54, 58. For example, BaFe platelets are particles which can have their easy axis so oriented. A decreasing amplitude AC magnetic transfer field, emanating from the pole tips 18, 32, passes through the magnetic surfaces 48, 54, 58, 50, thereby effecting a transfer of the information recorded on the surfaces 48, 50 to the surfaces 54, 58, in a manner known in the art.

The apparatus 10 is designed for rapid loading and unloading of a slave diskette, leading to low-cost, high-volume duplication. To those ends, it will be appreciated that the adhesive 53, used to bond the master diskettes to the pole pieces 18, 32, is of a non-permanent character allowing for rapid replacement of the master diskettes as required. Furthermore, the two master disks and the slave disk are composed preferably of standard floppy substrates of polyethylene terephthalate (PET). The use of a PET substrate allows the master disks to be recorded by means of conventional floppy disk recorders; no special recording apparatus is required further reducing duplication costs.

Even though a substrate of a conventional floppy disk has a thickness on the order of only seventy-six microns, cross talk through the slave substrate 52, between the recording of the master surface 48 to the slave surface 58 and the master surface 50 to the slave surface 54, is negligible. This is because the signal amplitudes from the surfaces 48, 50 fall off in accordance with the well known spacing loss expression $55d/\lambda(db)$, where d is the distance from the recorded surface and $\lambda$ is the recorded signal wavelength. For example, the amplitude of a signal having a wavelength of seventy-six microns, recorded at the master surface 50, is attenuated by 55 db when duplicated at the surface 54 of the slave diskette. The bit density on a typical high density disk is on the order of 380 bits per millimeter. A 76-micron wavelength, on the other hand, corresponds to a bit density of only 25 bits per millimeter. In other words, the shorter wavelength signals used in a typical disk recording will be attenuated much more than will a 76-micron wavelength signal. Therefore, cross talk to the opposite sides of the slave disks from the masters may be ignored. This allows two-sided duplication onto a floppy slave from two masters in a single transfer cycle.

The invention has been described in detail with particular reference to preferred embodiments thereof, but it will be understood that variations and modifications can be effected within the spirit and the scope of the invention. For example, it will be clear to those skilled in the art that the invention is equally applicable to the duplication of information on a single-sided slave diskette. For that purpose, a single-sided slave diskette is clamped in a contact-transfer zone defined on one side by one of the pole pieces 18 or 32 and on the opposite side by the recording surface of a master diskette to be duplicated.

What is claimed is:

1. Electromagnetic drive circuitry, for use with anhysteretic recording apparatus, for subjecting a flexible magnetic master disk and a flexible magnetic slave disk to an alternating magnetic transfer field of progressively diminishing strength while the master disk and the slave disk are held in a stationary position in a contact-transfer zone, said circuitry comprising:

a) an energizable electromagnetic device shaped to define a closed-loop flux-conducting path extending between a first planar pole tip spaced with respect to a second planar pole tip to cooperatively secure the master disk in non-slipping engagement with the slave disk in a contact-transfer zone between said two planar pole tips;

b) transformer means having an input primary winding magnetically coupled to an output secondary winding;

c) means arranged for connecting an alternating electrical control signal source to said primary winding;

d) motor means for effecting relative movement between said primary winding and said secondary winding for changing the amount of magnetic coupling between said windings; and e) switch means, operably associated with said motor means and said secondary winding, for coupling said secondary winding to said electromagnetic device when said motor means causes the magnetic coupling between said primary winding and said secondary winding to decrease, to develop an alternating magnetic field of progressively diminishing strength in the closed-loop flux-conducting path that produces a corresponding magnetic transfer field in the contact-transfer zone between said planar pole tips, thereby subjecting the master disk and the slave disk to a temporally varying magnetic transfer field of progressively diminishing strength while held in a stationary position in the contact-transfer zone.

2. Electromagnetic drive circuitry, for use with anhysteretic recording apparatus, for subjecting a flexible magnetic master disk and a flexible magnetic slave disk to an alternating magnetic transfer field of progressively diminishing strength while the master disk and the slave disk are held in a stationary position in a contact-transfer zone, said circuitry comprising:

a) an energizable electromagnetic device shaped to define a closed-loop flux-conducting path extending between a first planar pole tip spaced with respect to a second planar pole tip to cooperatively secure the master disk in non-slipping engagement with the slave disk in a contact-transfer zone between said two planar pole tips;

b) a voltage-controlled device arranged to produce an alternating electrical signal of a given frequency;

c) a function generator arranged for producing a progressively decreasing control voltage and having an output connected to said voltage-controlled device for progressively decreasing the amplitude of its alternating electrical output signal; and d) means, coupling the output of said voltage-controlled device and said electromagnetic device, to develop an alternating magnetic field of progressively diminishing strength in the closed-loop flux-conducting path that produces a corresponding magnetic transfer field in the contact-transfer zone between said planar pole tips, thereby subjecting the master disk and the slave disk to a temporally varying magnetic transfer field of progressively diminishing strength while held in a stationary position in the contact-transfer zone.

* * * * *